(12) United States Patent
Hou

(10) Patent No.: US 8,337,698 B2
(45) Date of Patent: Dec. 25, 2012

(54) SPIRAL WOUND REVERSE OSMOSIS MEMBRANE ELEMENT

(75) Inventor: Yizhi Hou, Shanghai (CN)

(73) Assignee: A. O. Smith (Shanghai) Water Treatment Products Co., Ltd., Shanghai (CN)

( * ) Notice: Subject to any disclaimer, the term of this patent is extended or adjusted under 35 U.S.C. 154(b) by 14 days.

(21) Appl. No.: 13/062,950

(22) PCT Filed: May 13, 2010

(86) PCT No.: PCT/CN2010/072738
§ 371 (c)(1),
(2), (4) Date: Mar. 9, 2011

(87) PCT Pub. No.: WO2011/050608
PCT Pub. Date: May 5, 2011

(65) Prior Publication Data
US 2012/0111787 A1  May 10, 2012

(30) Foreign Application Priority Data

Apr. 23, 2010 (CN) .......................... 2010 1 0154507

(51) Int. Cl.
*B01D 63/10* (2006.01)
*B01D 63/12* (2006.01)
*B01D 65/08* (2006.01)
(52) U.S. Cl. ........... 210/321.74; 210/321.6; 210/321.83; 210/456; 210/497.1
(58) Field of Classification Search ............... 210/321.6, 210/321.74, 321.83, 456, 497.1
See application file for complete search history.

(56) References Cited

U.S. PATENT DOCUMENTS

| | | |
|---|---|---|
| 3,933,646 A | 1/1976 | Kanamaru et al. |
| 4,855,058 A | 8/1989 | Holland et al. |
| 5,858,229 A | 1/1999 | Uemura et al. |
| 8,021,550 B2 | 9/2011 | Beauchamp et al. |

(Continued)

FOREIGN PATENT DOCUMENTS

CN   201244449   5/2009

(Continued)

OTHER PUBLICATIONS

English translation Chinese Patent No. 201244449 Y (May 2009).*

(Continued)

*Primary Examiner* — John Kim
(74) *Attorney, Agent, or Firm* — Michael Best & Friedrich LLP

(57) ABSTRACT

The present invention relates to a spiral wound reverse osmosis membrane element comprising at least one set of the water purification membrane module comprising a laminated mesh-like treated water flow guiding member, a reverse osmosis membrane and a mesh-like feed water flow guiding member wound around a central treated water pipe; the reverse osmosis membrane is folded at a folded side to form a feed water flow channel therein along its inner surface and closed and sealed at areas remote from the central treated water tube at two sides adjacent to the folded side; a treated water flow channel is formed between outer surfaces of adjacent reverse osmosis membranes and opened only at a treated water outlet which opens towards the central treated water tube and is closed and sealed at remaining three sides; the mesh-like treated water flow guiding member is disposed inside the feed water flow channel.

8 Claims, 3 Drawing Sheets

U.S. PATENT DOCUMENTS

| | | | |
|---|---|---|---|
| 2003/0034116 A1* | 2/2003 | Simonetti | 156/185 |
| 2010/0096308 A1 | 4/2010 | Beauchamp et al. | |
| 2010/0096319 A1 | 4/2010 | Beauchamp et al. | |
| 2011/0233128 A1 | 9/2011 | Beauchamp et al. | |
| 2011/0240546 A1 | 10/2011 | Beauchamp et al. | |
| 2012/0160758 A1 | 6/2012 | Beauchamp et al. | |

FOREIGN PATENT DOCUMENTS

| | | |
|---|---|---|
| JP | 198705890 | 1/1987 |
| JP | 10028849 | 2/1998 |
| JP | 10076146 | 3/1998 |
| JP | 2008043824 | 2/2008 |
| WO | 0044481 | 8/2000 |
| WO | WO0044481 A1 * | 8/2000 |
| WO | 2011/050608 | 5/2011 |

OTHER PUBLICATIONS

PCT/CN2010/072738 International Preliminry Report on Patentability and Written Opinion dated May 10, 2012 (15 pages with English Translation).

PCT/CN2010/072738 International Search Report dated Aug. 19, 2010 (5 pages—English Translation).

Korean Patent Office Action for Application No. 10-2011-07006005 dated Sep. 11, 2012 (7 pages—English Translation).

* cited by examiner

SPIRAL WOUND REVERSE OSMOSIS MEMBRANE ELEMENT

BACKGROUND OF THE INVENTION

The present invention relates to the technology of water purification and treatment and particularly pertains to a reverse osmosis membrane element for removing impurities in water such as sands, sludge, colloids, microorganisms, virus, organic materials and inorganic salt and more particularly pertains to a spiral wound reverse osmosis membrane element.

Currently, known reverse osmosis membrane elements are formed by winding purification membrane modules, each of which is formed by laminating a mesh-like treated water guiding member, a reverse osmosis membrane and a mesh-like feed water flow guiding member, around a central treated water tube. The reverse osmosis membrane is folded to form a feed water flow channel therein along its inner surface and the mesh-like feed water flow guiding member is disposed inside the feed water flow channel. A treated water flow channel is formed between outer surfaces of adjacent reverse osmosis membranes after folding and the mesh-like treated water guiding member is disposed inside the treated water flow channel. This kind of spiral wound reverse osmosis membrane element glues the treated water flow channel at two sides at two end surfaces and at one side remote from the central treated water tube by means of glue so that the treated water flow channel has an opening facing towards the central treated water tube; after the water purification member modules are wound around the central treated water tube, the entire outer surface is wrapped by an outer plastic strip and is thereby closed and sealed. In this kind of spiral wound reverse osmosis membrane element, water first enters the feed water flow channel from one end surface of the element; a portion of the water is filtered by the reverse osmosis membranes to form treated water which enters the central treated water tube via the mesh-like treated water guiding members; another portion of the water which has not been filtered forms concentrated water which flows along the mesh-like feed water flow guiding members in the feed water flow channels and is discharged from another end surface of the element. In this kind of spiral wound reverse osmosis membrane element, the direction from which the feed water enters and the direction to which the concentrated water is discharged are the same. However, as the flow channel is wide but the flow path is short, the velocity of the feed water along the flow channel is relatively low, and concentration polarization easily occurs along the membrane surface, therefore resulting in contamination of the membrane element, low desalination rate and treated water volume, as well as poor durability of the membrane element.

BRIEF SUMMARY OF THE INVENTION

In view of the aforesaid disadvantages now present in the prior art, the present invention provides a spiral wound reverse osmosis membrane element for reducing concentration polarization along the surface of the existing membrane element, so as to overcome the contamination problem of the membrane element and enhance the durability of the membrane element.

The present invention overcomes the aforementioned technical problems by the following:

A spiral wound reverse osmosis membrane element which is formed by winding at least one set of water purification membrane module around a central treated water pipe, and each set of the water purification membrane module is formed by laminating a mesh-like treated water flow guiding member, a reverse osmosis membrane and a mesh-like feed water flow guiding member; the reverse osmosis membrane is folded at a folded side to form a feed water flow channel therein along its inner surface; a treated water flow channel is formed between outer surfaces of adjacent reverse osmosis membranes; the mesh-like feed water flow guiding member is disposed inside the feed water flow channel; the mesh-like treated water flow guiding channel is disposed inside the treated water flow channel; the treated water flow channel is opened only at a treated water outlet which opens towards the central treated water tube, and the treated water flow channel is closed and sealed at remaining three sides; it is characterized in that the feed water flow channel is closed and sealed at areas remote from the central treated water tube at two sides adjacent to the folded side, so that the feed water flow channel forms small sections of raw water inlets respectively at areas closer to the central treated water tube at the two sides, and a concentrate outlet is formed at the feed water flow channel at a side opposite to the folded side.

In one embodiment of the present invention, the feed water flow channel is closed and sealed at areas remote from the central treated water tube at two sides adjacent to the folded side by gluing the areas remote from the central treated water tube by means of glue before the water purification membrane module is wound around the central treated water tube.

The feed water flow channel is closed and sealed at two sides adjacent to the folded side by using annular end covers to block outer areas of two end surfaces of the spiral wound reverse osmosis membrane element respectively after the water purification membrane module is wound around the central treated water tube, and a gap is provided between the central treated water tube and each of the end covers.

The length of the raw water inlets is ¼ to ⅓ of the length of the feed water flow channel at two sides adjacent to the folded side.

In one embodiment of the present invention, there are two sets of water purification membrane modules.

By means of the present invention, the feed water flow channel is closed and sealed at areas remote from the central treated water tube at two sides adjacent to the folded side, so that the feed water flow channel forms small sections of raw water inlets respectively at areas closer to the central treated water tube at the two sides, and a concentrate outlet is formed at the feed water flow channel at a side opposite to the folded side. In this kind of spiral wound reverse osmosis membrane element, water enters the feed water flow channels via the raw water inlets of the feed water flow channels at two end surfaces of the membrane element; a portion of the water is filtered by the reverse osmosis membranes to form treated water which enters the treated water flow channels and flows along the mesh-like treated water guiding members to enter the central treated water tube; another portion of the water which has not been filtered forms concentrated water which flows along the mesh-like feed water flow guiding members in the feed water flow channels and is discharged from the concentrate outlets of the feed water flow channels which is opposite to the folded side. In other words, concentrated water is discharged from the side circumferential surface of the spiral wound reverse osmosis membrane element along the winding direction of the water purification membrane modules, which is unlike existing spiral wound reverse osmosis membrane element where raw water enters from one end surface of the spiral wound reverse osmosis membrane element and concentrated water is discharged from another end surface of the membrane element. With the aforementioned improvements, the reverse osmosis membrane element of the present invention increases the water flow velocity along the membrane surface and therefore reduces concentration polarization and slows down the speed of contamination of the spiral wound type membrane element, and thereby enhancing the durability of the membrane element.

In a further improvement of the present invention, in order to eliminate dead angles of the raw water inlets and to prevent the raw water inlets from clogging and thereby affecting water quality, feed water tubes are provided inside the raw water inlets, and the feed water tube is provided with a plurality of through-holes which open towards the concentrate outlets.

In a preferred embodiment of the present invention, the opening of the feed water tube aligns with the two sides of the feed water flow channel which are adjacent to the folded side. In this way, feed water could enter more smoothly.

In an embodiment of the present invention, the reverse osmosis membrane is folded to form two layers of feed water flow channels and a treated water flow channel. Each layer of the feed water flow channels is provided with raw water inlets at two ends. Each of the raw water inlets is provided with a feed water tube therein.

BRIEF DESCRIPTION OF THE DRAWINGS

The present invention is described in detail below with reference to the accompanying drawings and embodiments of the present invention.

DETAILED DESCRIPTION OF THE INVENTION

Embodiment 1

Figure 1:
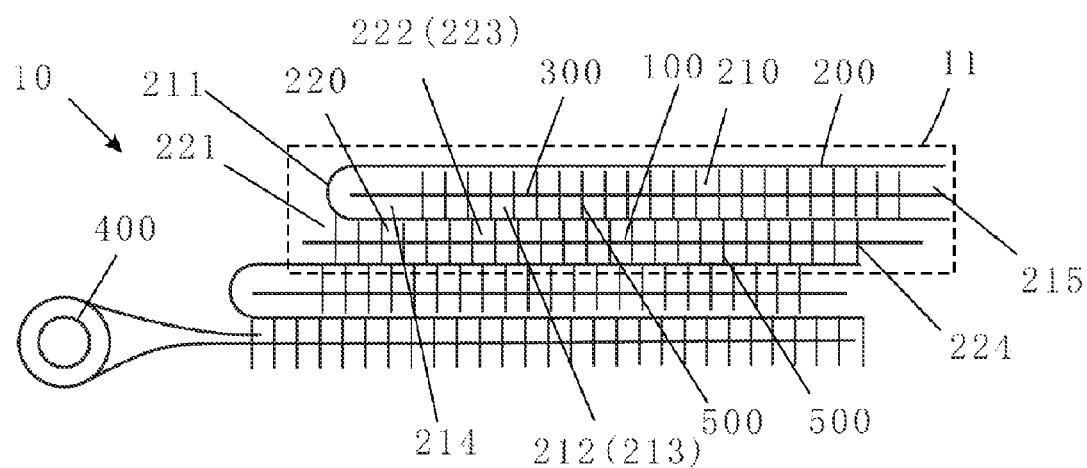
FIG. 1 illustrates the structure of the spiral wound reverse osmosis membrane as in Embodiment 1 before winding.

As illustrated in FIG. 1, the spiral wound reverse osmosis membrane element 10 of the present embodiment is formed by winding two sets of water purification membrane modules 11 (in the present embodiment there are two sets) around a central treated water pipe 400, and each set of the water purification membrane module 11 is formed by laminating a mesh-like treated water flow guiding member 100, a reverse osmosis membrane 200 and a mesh-like feed water flow guiding member 300.

The reverse osmosis membrane 200 is folded to form a feed water flow channel 210 therein along its inner surface. A treated water flow channel 220 is formed between outer surfaces of adjacent membranes (the bottom outer surface of the reverse osmosis membrane of the water purification membrane module at the bottom and the upper outer surface of the reverse osmosis membrane of the water purification membrane module at the top also form treated water flow channels after winding). The mesh-like feed water flow guiding member 300 is disposed inside the feed water flow channel 210. The mesh-like treated water flow guiding channel 100 is disposed inside the treated water flow channel 220. The treated water flow channel 220 is opened only at a treated water outlet 221 which opens towards the central treated water tube 400, and the treated water flow channel 220 is closed and sealed by glue 500 at remaining three sides 212, 213 and 214. The feed water flow channel 210 is closed and sealed at areas remote from the central treated water tube 400 at two sides 212, 213 adjacent to the folded side 211, so that the feed water flow channel 210 forms small sections of raw water inlets 214 respectively at areas closer to the central treated water tube 400 at the two sides 212, 213, and a concentrate outlet 215 is formed at the feed water flow channel 210 at a side opposite to the folded side 211.

Figure 3:
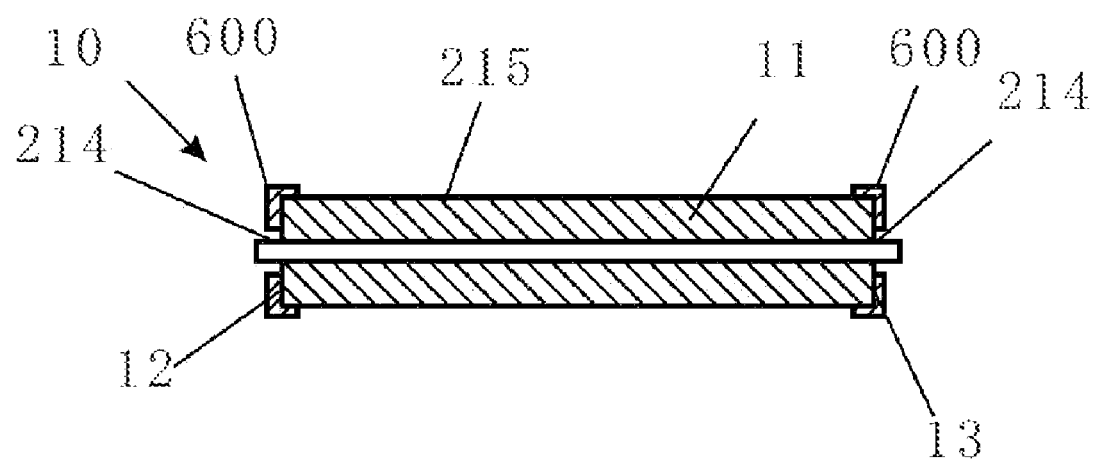
FIG. 3 illustrates the structure of an alternative means to close and seal the feed water inlets formed by the feed water flow channel as in Embodiment 2.

The feed water flow channel 210 is closed and sealed at areas remote from the central treated water tube 400 at two sides 212, 213 adjacent to the folded side 211. As illustrated in FIG. 1, the feed water flow channel is closed and sealed by using glue 500 to glue areas remote from the central treated water tube 400 before the water purification membrane module 11 is wound around the central treated water tube 400, and small sections of openings are provided at the feed water flow channel at an areas closer to the central treated water tube 400 to form raw water inlets 214. As illustrated in FIG. 3, annular end covers 600 (coated with glue inside) block outer areas of the two end surfaces 12, 13 of the spiral wound reverse osmosis membrane element respectively after the water purification membrane module 11 is wound around the central treated water tube 400, and a gap is provided between the central treated water tube 400 and each of the end covers 600 to form raw water inlets 214.

According to $V=Q/(L_1 \times T)$ where V is water flow velocity, Q is feed water flow volume, $L_1$ is the length of the feed water flow channel (i.e. the length of the raw water inlet 214), and T is thickness of flow channel, when the feed water flow volume Q is constant and $L_1$ is reduced, the feed water flow velocity is increased, and therefore the flow velocity along the membrane surface is increased. Experiments have proved that it is the best when the length of the feed water flow channel (i.e. the length of the raw water inlet 214) is ¼-⅓ of the length of the two sides adjacent to the folded side (i.e. the length of the membrane).

Figure 2:
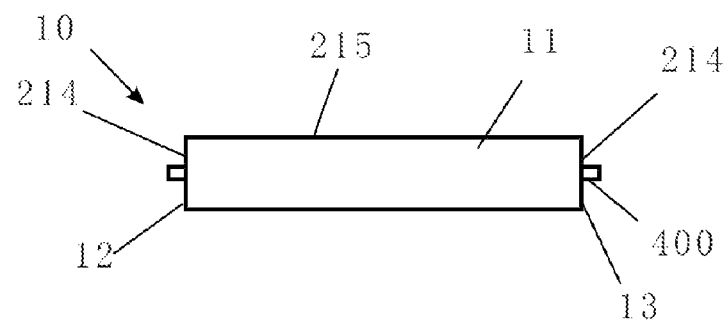
FIG. 2 illustrates the structure of the spiral wound reverse osmosis membrane as in Embodiment 1 after winding.

In the present embodiment, the feed water flow channel 210 is closed and sealed at areas remote from the central treated water tube 400 at two sides 212, 213 adjacent to the folded side 211, so that the feed water flow channel 210 forms small sections of raw water inlets 214 respectively at areas closer to the central treated water tube 400 at the two sides 212, 214, and a concentrate outlet 215 is formed at the feed water flow channel 210 at a side opposite to the folded side 211. In this kind of spiral wound reverse osmosis membrane element (as illustrated in FIG. 2), water enters the feed water flow channels 210 via the raw water inlets 214 of the feed water flow channels 210 at two end surfaces 12, 13 of the membrane elements; a portion of the water is filtered by the reverse osmosis membranes 200 to form treated water which enters the treated water flow channels 220 and flows along the mesh-like treated water guiding members 100 to enter the central treated water tube 400; another portion of the water which has not been filtered forms concentrated water which flows along the mesh-like feed water flow guiding members 300 in the feed water flow channels 210 and is discharged from the concentrate outlets 215 of the feed water flow channels 210 which is opposite to the folded side. In other words, concentrated water is discharged from the side circumferential surface of the spiral wound reverse osmosis membrane element 10 along the winding direction of the water purification membrane modules 10, which is unlike existing spiral wound reverse osmosis membrane elements where raw water enters from one end surface of the spiral wound reverse osmosis membrane element and concentrated water is discharged from another end surface of the membrane element.

Embodiment 2

As illustrated in FIG. 3, the present embodiment differs from Embodiment 1 in that the feed water flow channel 210 is closed and sealed at areas remote from the central treated water tube 400 at two sides 212, 213 adjacent to the folded side 211 in a different manner. In the present embodiment, annular end covers 600 (coated with glue inside) block the outer area of the two end surfaces 12, 13 of the spiral wound reverse osmosis membrane element after the water purification membrane modules 11 are wound around the central treated water tube 400, and a gap is provided between the central treated water tube 400 and each of the end covers 600 to form raw water inlets 214. Other structures of the present embodiment are similar to those of Embodiment 1. The manner of sealing in the present embodiment is advantageous in that it is easier to assemble the membrane element.

Embodiment 3

Figure 4:
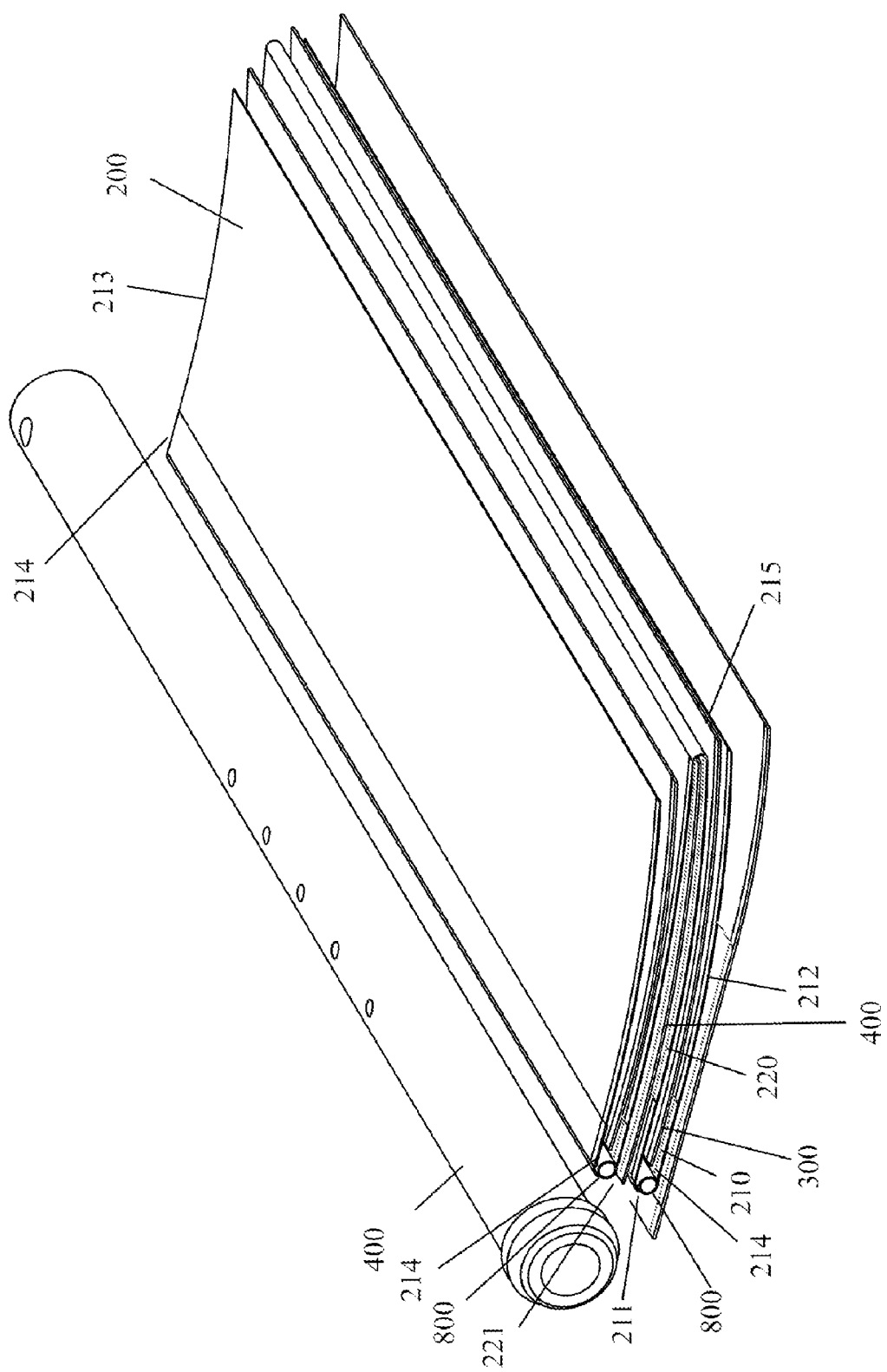
FIG. 4 illustrates the structure of the spiral wound reverse osmosis membrane as in Embodiment 3.

As illustrated in FIG. 4, the present embodiment is different from Embodiments 1 and 2 in that feed water tubes 800 are provided inside the raw water inlets 214 to eliminate dead angles of the raw water inlets and to prevent the raw water inlets from clogging and thereby affecting water quality. The feed water tube 800 extends from the raw water inlet 214 at one end of the membrane element to the raw water inlet 214 at the other end of the member element, and the feed water tube 800 is provided with a plurality of through-holes (not shown in the figures) which open towards the concentrate outlets 215.

With the aforementioned improvements, the feed water first enters the feed water tubes 800, and then the feed water sprays into the feed water flow channels 300 from the through-holes of the feed water tubes 800 towards the direction of the concentrate outlets 215. In this way, feed water is entered in an even manner and feed water dead angle could be eliminated, thereby preventing clogging.

In the present embodiment, the reverse osmosis membrane 200 is folded to form two layers of feed water flow channels 210 and a treated water flow channel 220. Each layer of the feed water flow channels 210 is provided with raw water inlets 214 at two ends and a concentrate outlet 215. Each of the raw water inlets 214 is provided with a feed water tube 800 therein, and the opening of the feed water tube 800 aligns with the two sides 212, 213 of the feed water flow channel 210. In this way, feed water could enter more smoothly.

From the above description, it could be perceived that the reverse osmosis membrane element of the present invention increases the water flow velocity along the membrane surface and therefore reduces concentration polarization and slows down the speed of contamination of the spiral wound type membrane element, and thereby enhancing the durability of the membrane element.

The above embodiments are for the purpose of description so that those skilled in the art could better comprehend and implement the present invention and therefore should not be regarded as limiting the scope of protection of the present invention. Any other equivalent variation or decoration not deviated from the spirit of the present invention falls within the scope of protection of the present invention.

What is claimed is:

1. A spiral wound reverse osmosis membrane element which is formed by winding at least one set of water purification membrane module around a central treated water pipe, and each set of the water purification membrane module is formed by laminating a mesh-like treated water flow guiding member, a reverse osmosis membrane and a mesh-like feed water flow guiding member; the reverse osmosis membrane is folded at a folded side to form a feed water flow channel therein along its inner surface; a treated water flow channel is formed between outer surfaces of adjacent reverse osmosis membranes; the mesh-like feed water flow guiding member is disposed inside the feed water flow channel; the mesh-like treated water flow guiding channel is disposed inside the treated water flow channel; the treated water flow channel is opened only at a treated water outlet which opens towards the central treated water tube, and the treated water flow channel is closed and sealed at remaining three sides; the feed water flow channel is closed and sealed at areas remote from the central treated water tube at two sides adjacent to the folded side, so that the feed water flow channel forms small sections of raw water inlets respectively at areas closer to the central treated water tube at the two sides, and a concentrate outlet is formed at the feed water flow channel at a side opposite to the folded side.

2. The spiral wound reverse osmosis membrane element as in claim 1, wherein the feed water flow channel is closed and sealed at areas remote from the central treated water tube at two sides adjacent to the folded side by gluing the areas remote from the central treated water tube by means of glue before the water purification membrane module is wound around the central treated water tube.

3. The spiral wound reverse osmosis membrane element as in claim 1, wherein the feed water flow channel is partially closed and sealed at two sides adjacent to the folded side by using annular end covers to block outer areas of two end surfaces of the spiral wound reverse osmosis membrane element respectively after the water purification membrane module is wound around the central treated water tube, and a gap is provided between the central treated water tube and each of the end covers.

4. The spiral wound reverse osmosis membrane element as in claim 1, wherein length of the raw water inlets is ¼ to ⅓ of length of the feed water flow channel at two sides adjacent to the folded side.

5. The spiral wound reverse osmosis membrane element as in claim 1, wherein there are two sets of water purification membrane modules wound around the central treated water tube.

6. The spiral wound reverse osmosis membrane element as in claim 1, wherein feed water tubes are provided inside the raw water inlets, and each of the feed water tube is provided with a plurality of through-holes which open towards the concentrate outlets.

7. The spiral wound reverse osmosis membrane element as in claim 6, wherein openings of the feed water tubes aligns with the two sides of the feed water flow channel which are adjacent to the folded side.

8. The spiral wound reverse osmosis membrane element as in claim 6 or 7, wherein the reverse osmosis membrane is folded to form two layers of feed water flow channels and a treated water flow channel; each layer of the feed water flow channels is provided with raw water inlets at two ends and each of the raw water inlets is provided with a feed water tube therein.

* * * * *